Nov. 22, 1938. J. H. TAYLOR 2,137,864
METHOD OF MAKING PIPE FITTINGS
Filed Sept. 28, 1935 6 Sheets-Sheet 6

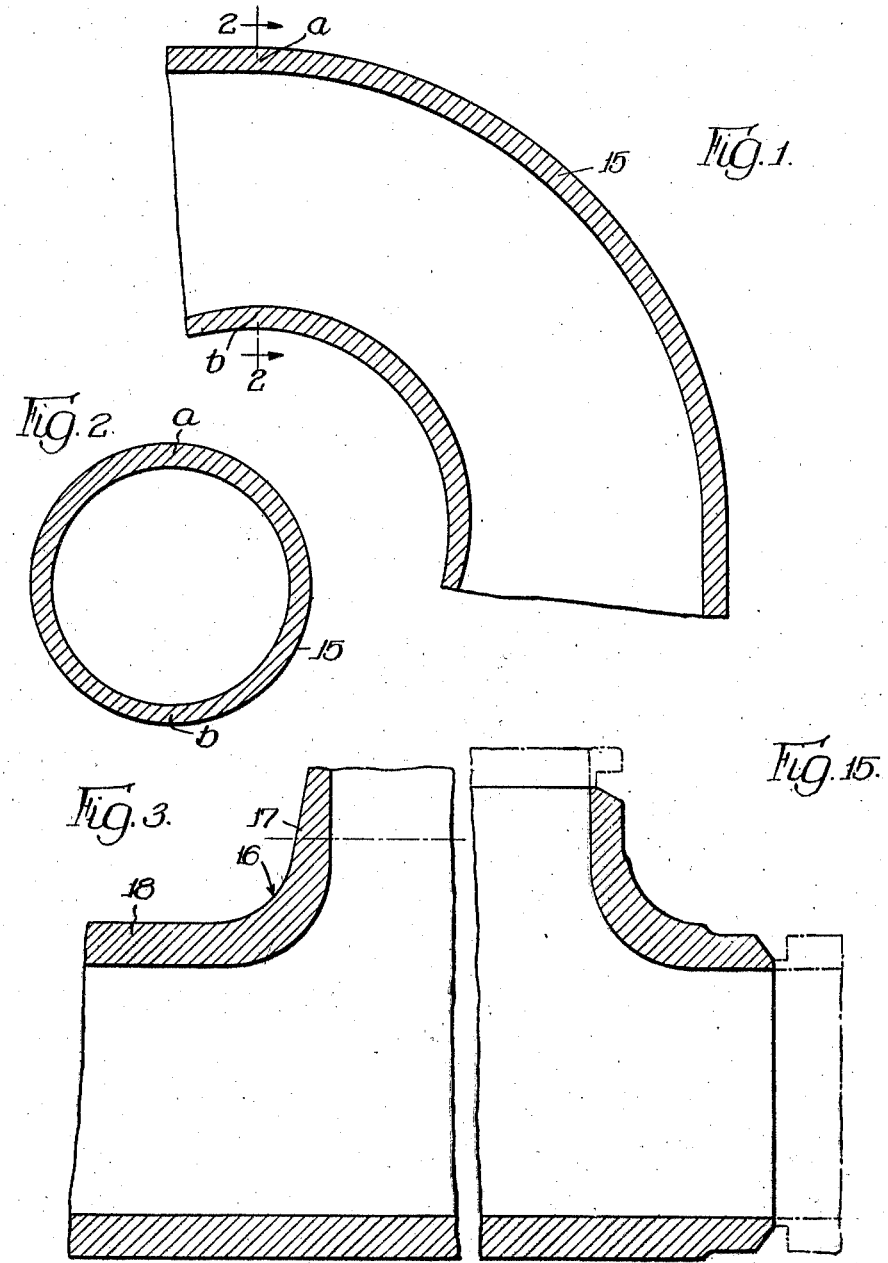

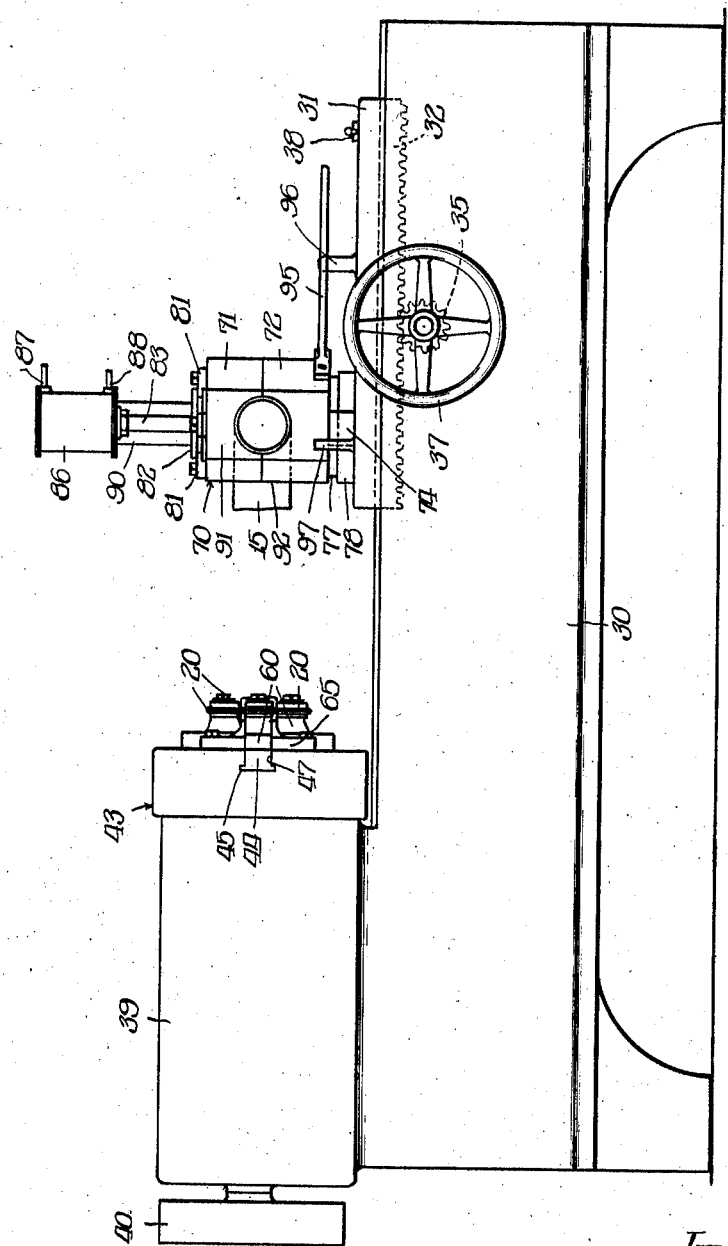

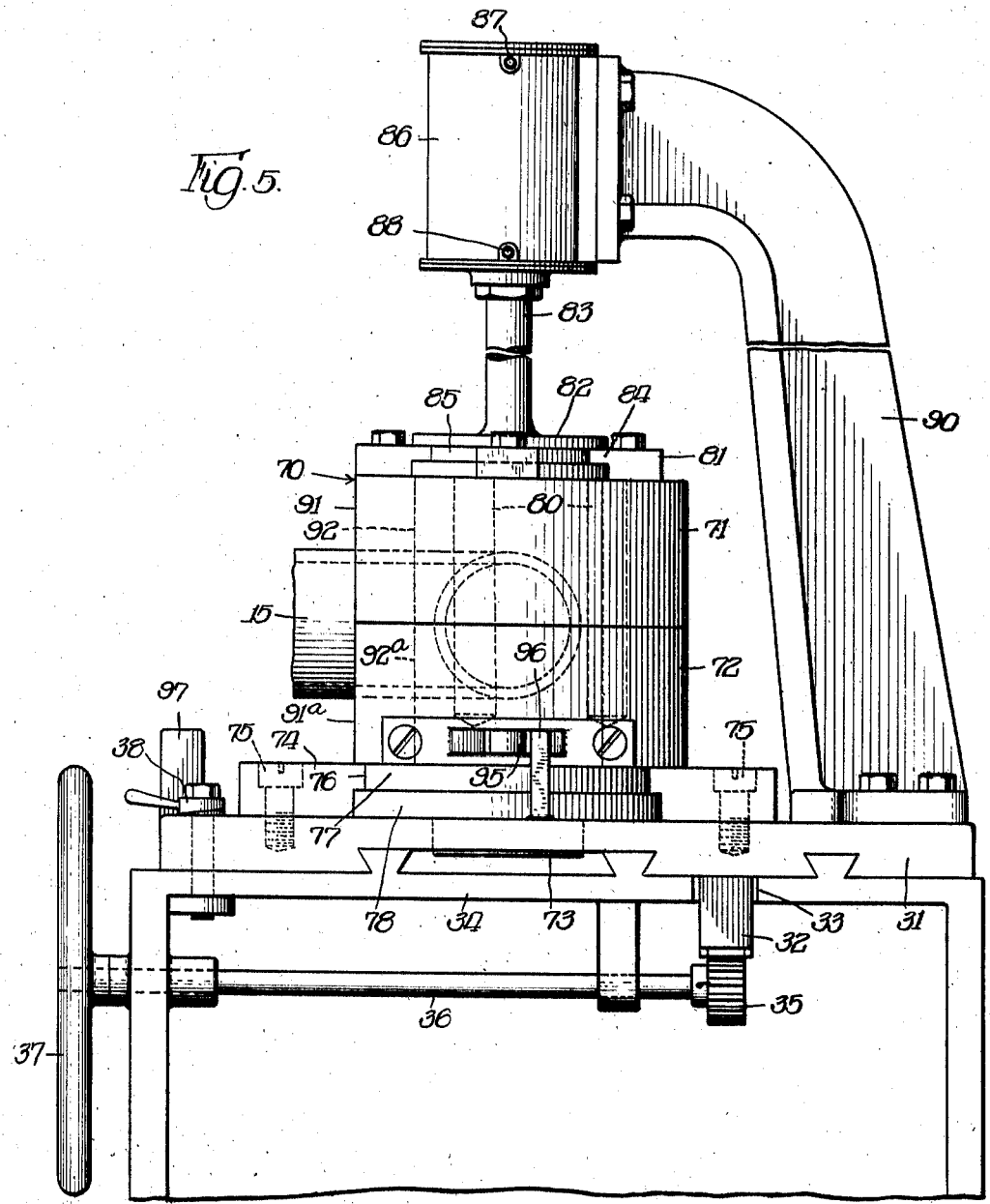

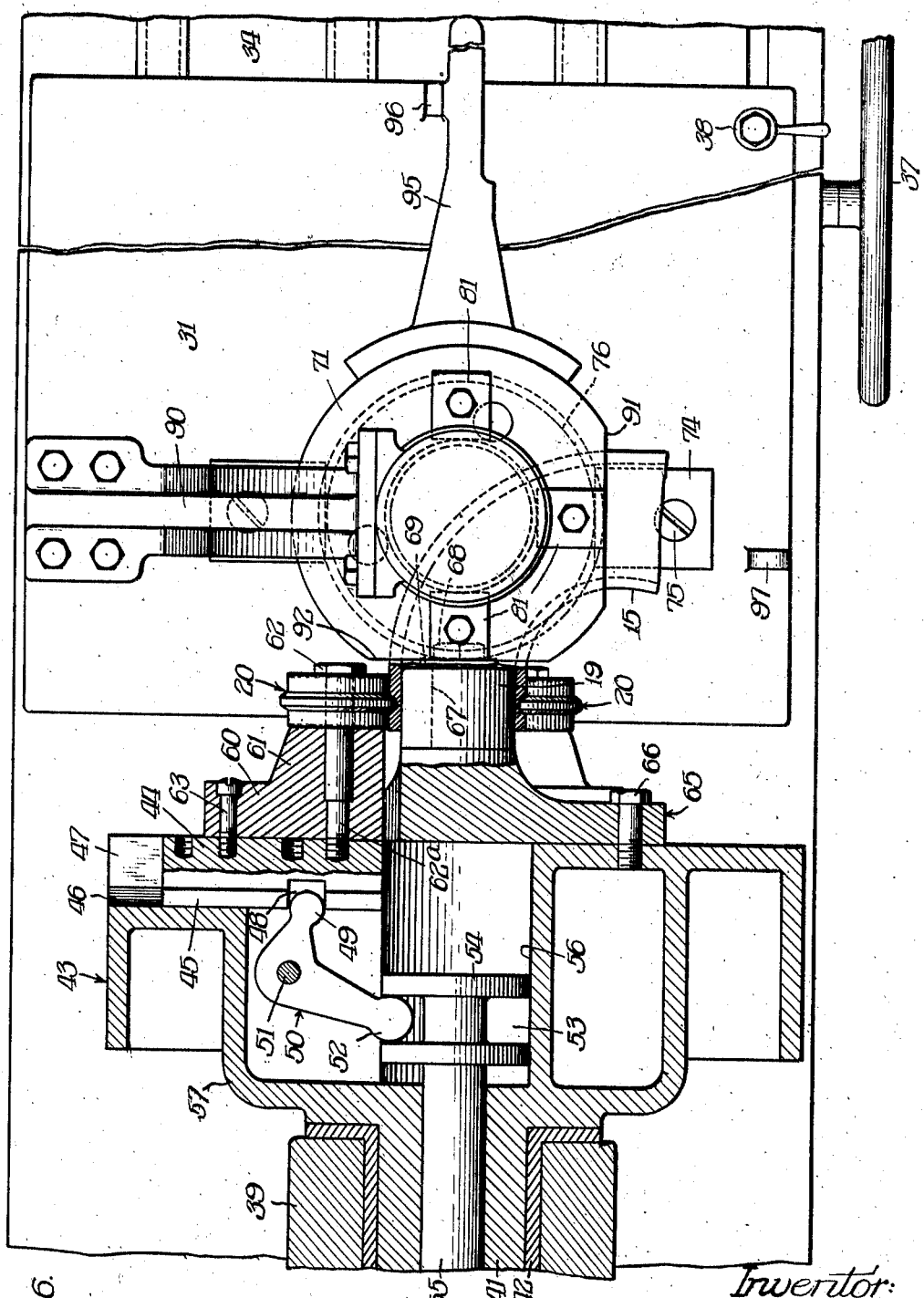

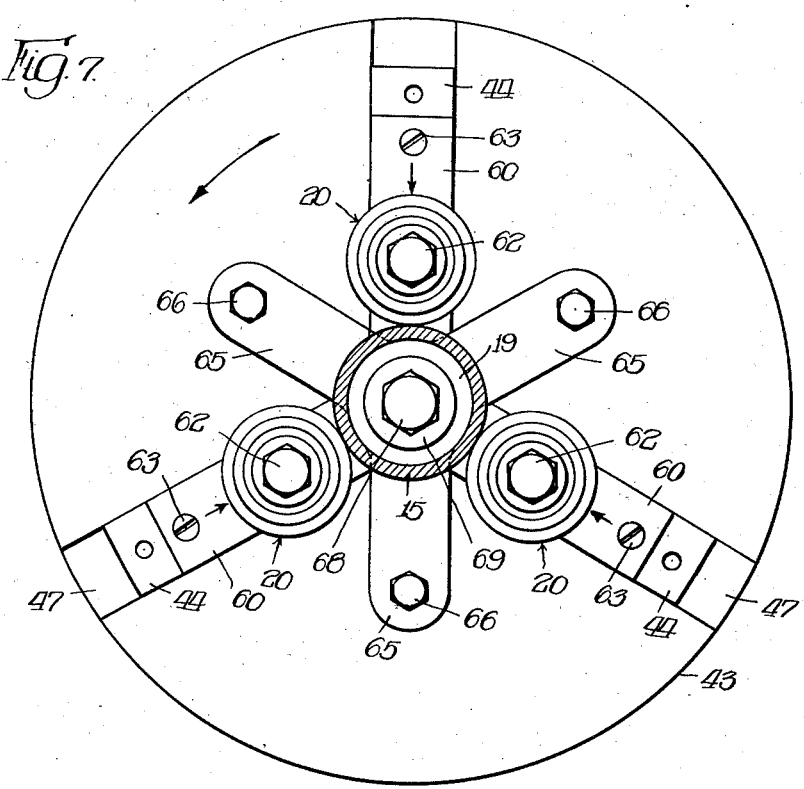
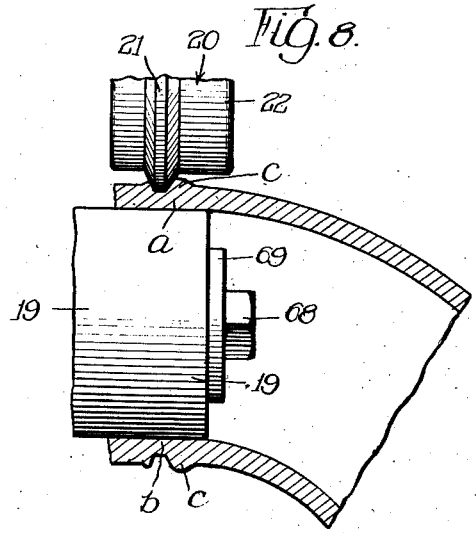

Inventor:
James Hall Taylor,
By Brown, Jackson, Boettcher & Kinner
attys

Patented Nov. 22, 1938

2,137,864

UNITED STATES PATENT OFFICE 2,137,864

METHOD OF MAKING PIPE FITTINGS

James Hall Taylor, Oak Park, Ill.

Application September 28, 1935, Serial No. 42,607

4 Claims. (Cl. 29—157)

My invention relates to pipe fittings, such as elbows, return bends, and T's, and contemplates a new method of and means for forming their ends for welding to adjoining pipe lengths.

It is common practice to make pipe bends, whether elbows or return bends, from appropriate lengths of seamless tubing curved to the desired radius, this much of the process leaving irregular ends which must be cut off square, and, if intended for welding, be formed to present, with the end of an adjacent pipe length, an annular trough or groove for receiving welding metal. These end forming steps resolve themselves into forming an external bevel, and my invention contemplates a new method and means to that end.

It is a known fact that, in the bend as it comes from the first part of the process, the walls, by reason of variations which occur in commercial seamless tubing and by reason of the shifting of metal in the act of curving, are not of uniform thickness. It is highly desirable that they be of uniform thickness, at their ends, where they meet the adjoining pipe lengths, and it is a purpose of my invention to provide a method of and means for beveling the end and, at the same time, bringing the wall, at the end, to uniform thickness.

My invention is also applicable to the formation of ends, such as above described, on T's which are made of a length of seamless tubing by outwardly displacing a mid-portion of the wall to form the neck. In such T's, the wall of the neck, as the article comes from the first part of the process, tapers outwardly in section, and a considerable part of the neck must be removed if its ultimate end is to be of adequate thickness. My invention, applied to the neck, results in a considerable saving in material, and insures bringing its end to uniform wall thickness, and it may also be applied to the other two ends of the T to form them properly for connection to the adjoining pipe lengths, at the same time bringing such ends down to the proper and uniform wall thickness.

My invention is illustrated in the accompanying drawings, in which—

Figure 1 is a lengthwise central sectional view of a pipe elbow as it comes from the first part of present practice, after the length of tubing from which it is made has been bent to the desired curvature;

Figure 2 is a cross-sectional view taken on the plane of the line 2—2 of Figure 1;

Figure 3 is a fragmentary lengthwise central sectional view of a T as it comes from the first part of present practice, after a neck has been formed by outwardly displacing a mid-portion of the wall of the tubing from which it is made;

Figure 4 is a front elevational view of a machine for practicing the method of my invention;

Figure 5 is an end view of the machine, looking at the righthand end thereof (Figure 4), on an enlarged scale, parts being broken away;

Figure 6 is a fragmentary plan view of the machine, on an enlarged scale, partly in section;

Figure 7 is a face view of the chuck of the machine, this view showing, in section, part of a fitting, such as an elbow, disposed on the mandrel, which will be referred to;

Figure 8 is a fragmentary lengthwise central sectional view of an elbow, as in Figure 1, illustrating the first part of the method of my invention;

Figure 9:
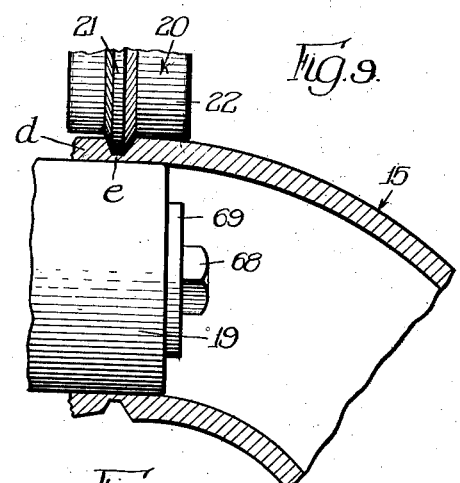
Figure 9 is similar to Figure 8, illustrating the further effect as the method of my invention proceeds.
Figure 10:
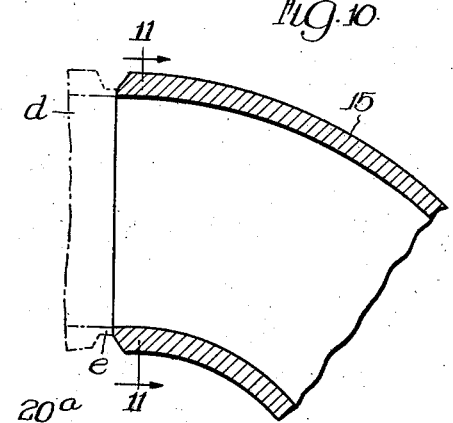
Figure 10 illustrates the next step, in completion of the fitting.
Figure 11:
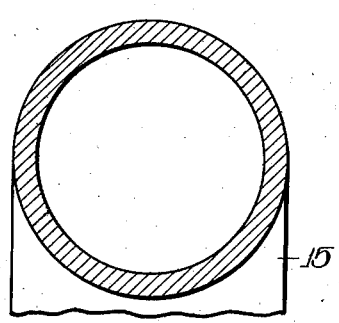
Figure 11 is a cross-sectional view taken on the plane of the line 11—11 of Figure 10.
Figure 12:
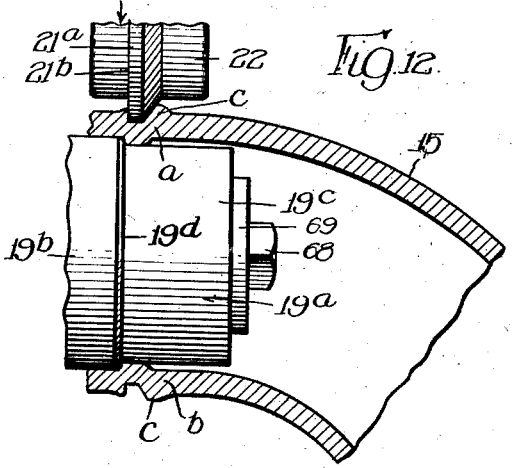
Figure 13:
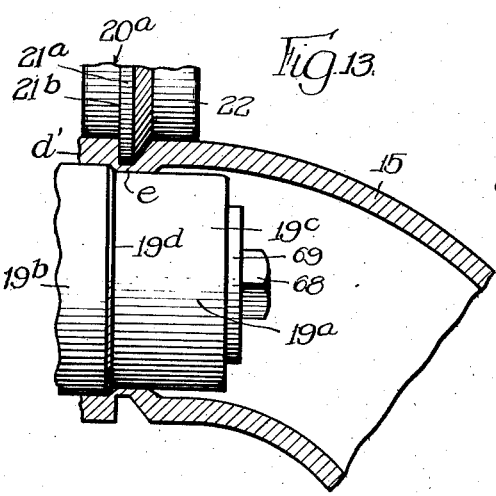
Figure 14:
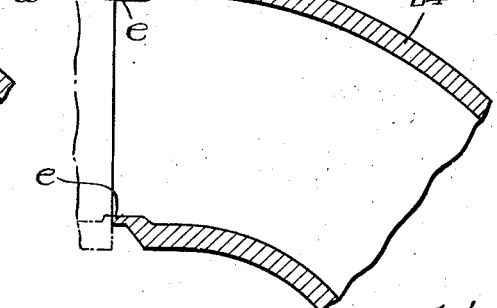

Figures 12, 13 and 14 correspond to Figures 8, 9 and 10, illustrating a modification which will be described;

Figure 15 is a view similar to and complementary to Figure 3, showing in full lines the results of the application of my invention to a T, the dot and dot-and-dash lines being for the purposes of description to follow.

In Figures 1 and 2 I have shown an elbow 15 as it comes from the first part of the present practice above referred to. In such an elbow, the wall at the outer side thereof and at the end is appreciably thicker than the wall at the inner side at the end. In other words, the wall at $a$ is appreciably thicker than the wall at $b$, the wall thickness of the end of the elbow decreasing from $a$ in both directions toward the diametrically opposite point $b$.

In Figure 3 I have shown a T 16 as it comes from the first part of the present practice above referred to. The wall thickness of neck 17 of this T tapers outward, as shown, and, anywhere above the dot-and-dash line, the wall of the neck is too thin for welding to the adjoining pipe with which the T is intended to be used. Also, the wall thickness at the ends 18 of the body of the T is considerably greater than what it should be for welding to the adjoining pipe with which the T is intended to be used.

According to my invention, I roll an outwardly widening annular groove in the fitting end, and roll the adjacent fitting wall to uniform thickness, in a manner to be described. This I accomplish, in the preferred embodiment of my invention, by one roller, that is, one kind of roller, in effect forming the groove and distributing the metal evenly in one operation.

The machine for the purpose of the method is one for holding the fitting in position, supporting the fitting on the inside, and applying a concentric progressive rolling operation on the outside, and it is in order that I now describe a suitable machine with these capabilities and having the proper roller or rollers according to my invention.

Reference is made to Figures 4, 5, 6 and 7.

I have shown, by way of example, a machine in the nature of a turret lathe suitable for my purpose. This machine is, in general, of known construction, and need not be illustrated or described in detail, except in so far as certain features thereof are especially for performing the method of my invention. The machine is shown in elevation in Figure 4. It comprises a suitable frame 30 upon which a carriage 31 is mounted for sliding movement lengthwise of the frame. This carriage may be adjusted in any suitable manner and is conveniently provided, for this purpose, with a depending rack bar 32 which extends through a slot 33 in the top plate or bed 34 of the machine. A pinion 35, secured upon the inner end of a shaft 36, suitably mounted for rotation and transversely of frame 30, meshes with rack bar 32, a hand wheel 37 being secured upon the outer end of the shaft. This provides means for adjusting carriage 31 upon the frame and for slowly moving this carriage in desired direction lengthwise of the frame, as desired. A clamp 38, of known type, is provided for locking the carriage 31 in adjustment.

The head of the machine is indicated at 39, and a pulley 40, which may be driven in any convenient manner, is disposed adjacent the outer end of head 39 and has driving connection, in a known manner, to a tubular spindle 41 rotatably mounted in the head, there being a bushing 42 disposed about this spindle. Spindle 41 carries, at its inner end, a chuck 43, broadly of known type, having in its inner face radially disposed grooves 47 which slidably receive chuck jaws 44. These jaws are provided with lateral base flanges 45 which engage into undercuts 46 of grooves 47. Each jaw 45 is further provided, in its inner face, with a recess 48 which receives the rounded end 49 of one arm of a bell crank 50 pivoted at 51 in the housing part 57 of the chuck. The other arm of the bell crank is provided with a rounded end 52, which engages into circumferential groove 53 of a head 54 at the inner end of a pull rod 55 slidably mounted through spindle 41. Head 54 is slidable in an enlarged bore 56 in housing 57, this bore being concentric with rod 55. Inward movement of rod 55 serves to move the chuck jaws 44 radially outward, and outward movement of rod 55 serves to move the jaws radially inward. The extent of movement of the jaws 45 is controlled by the extent of movement of rod 55, as will be understood. Any suitable means may be employed for imparting the desired movement to the pull rod 55 and, since means of this character is known, it is not deemed necessary to show or describe any particular means for this purpose. Suffice it to state that the pull rod is actuated to impart the desired movements to the chuck jaws at the desired rates.

Each of the jaws 44 carries a bracket 60, 61, upon which roller 20 is rotatably mounted, by means of a shouldered pin 62 passing through the roller and engaging into a bore in boss 61. The end portion of pin 62 is reduced and threaded to provide a screw element 62a which threads into jaw 44, the latter being suitably bored and threaded for this purpose. A screw 63 passes through bracket member 60, adjacent the outer end thereof, and threads into jaw 44. The latter is provided with a plurality of sets of bores corresponding to screw element 62a and screw 63, respectively, whereby bracket 60, 61 may be set farther outwardly, for operation on larger fittings, if desired.

A three-armed spider 65 is suitably secured, as by means of bolts 66, to the face of the chuck, the arms of this spider being disposed between the jaws 44, as shown in Figure 7. Spider 65 is provided with a central stud 67 projecting coaxially with the chuck and toward the carriage. The mandrel 19, in the form of a collar, is rotatably mounted upon stud 67 and is retained thereon in any suitable manner, as by a bolt 68 and an associated washer 69, best shown in Figure 7. The rollers 20 are thus disposed about the mandrel 19, in the same vertical plane, as shown in Figure 6.

A work holding clamp 70 is mounted upon carriage 31. This clamp comprises upper and lower blocks 71 and 72, respectively. These blocks are of cylindrical shape and block 72 is provided, at the lower end thereof, with a reduced coaxial boss 73 fitting in a corresponding opening in carriage 31, for permitting relative rotation of block 72. The lower end of block 72 seats upon the upper face of carriage 31 and this block is held against relative upward movement by means of clamps 74 secured to the carriage by screws 75, these clamps being provided with reduced tongues 76 which project into a groove 77 extending circumferentially of the block, the tongues 76 engaging over shoulder 78 formed by the groove.

Guide pins 80 are secured in block 71 and engage into corresponding bores in block 72 for assuring accurate register of the two blocks when closed together. Three clamps 81, bolted or otherwise suitably secured to the upper face of block 71, attach the latter to a cylindrical head 82 at the lower end of a piston rod 83 disposed coaxially with boss 73. Each clamp 81 is provided with a tongue element 84 which engages into a circumferential groove 85 formed in head 82, thus attaching block 71 to head 82 for vertical movement therewith while permitting relative turning movement of the block about the axis of rod 83 and boss 73. Piston rod 83 extends into a cylinder 86 and is there suitably secured to a piston (not shown) operating within the cylinder. Cylinder 86 is provided with suitable nipples 87 and 88 communicating by associated passages, in a known manner, with the interior of the cylinder above and below the piston, respectively. Suitable means, of known type, is provided for admitting fluid under pressure to either nipple and exhausting fluid through the other nipple, as desired. Preferably, the pressure fluid employed is water or other suitable liquid, the cylinder and associated parts providing means for hydraulically lowering and raising block 71.

Cylinder 86 is suitably secured to, and supported by, a bracket 90 bolted or otherwise suitably secured to carriage 31. Block 71 is provided with two flat faces 91 and 92 disposed at right angles, one to the other, and block 72 is provided with two corresponding flat faces 91a and 92a.

Block 72 is provided, in its upper surface, with a recess suitably formed and disposed for snug reception of the blank to be operated upon, such as the unfinished elbow 15 of Figure 1, block 71 being provided with a corresponding recess in its lower face, all as shown. These recesses, for an elbow such as elbow 15, are each semi-circular in cross-section and are shaped as the elbow, terminating in the flat faces just referred to and adapted to center at its ends with the axis of the mandrel 19, the ends of the elbow protruding.

A handle 95 is suitably secured to block 72 and is preferably so disposed as to extend therefrom in the plane thereof and substantially in alignment with the central vertical plane of flat face 92a of this block. Two stops 96 and 97 project upward from carriage 31 in the path of movement of handle 95. Stop 96 is so disposed that, when the handle is in contact therewith, the end of the elbow which projects beyond the flat faces 92 and 92a of clamp 70 is disposed coaxially with mandrel 19. Stop 97 is disposed at right angles to stop 96 so that, when handle 95 is moved into contact with stop 97, the end of the blank 15 which projects beyond flat faces 91 and 91a of clamp 70 is disposed coaxially with the mandrel 19.

It is thus apparent how the elbow is held in position for presentation to the mandrel 19, first one end of the elbow and then the other; how, with the elbow held in position, the carriage is moved toward the chuck and the end of the elbow slipped over the mandrel; and how, the elbow so supported, as shown in Figure 6, and the chuck rotated, and the pull rod 55 gradually withdrawn, the rollers 20 are rolled about the fitting end and urged radially inwardly to do their work.

It is now in order to refer to the form of the rollers 20. Each of them has the annular projection 21 of flattened V-shape cross-section, and the cylindrical element 22. The former is for the purpose of forming the outwardly widening groove in the end portion of the fitting, which action, as will be seen, results in an upsetting of the adjacent fitting wall, and the latter is for rolling down the adjacent fitting wall, all of which will now be described.

In forming the ends of a fitting such as the elbow 15, the article is heated to a proper working state and secured in position in the clamp 70 as illustrated in Figure 6. Handle 95 is then placed either against the stop 96 or against the stop 97, one of the protruding ends of the elbow being thus presented to the mandrel 19. Carriage 31 is then moved toward the mandrel, the rollers 20 being brought outwardly sufficiently to permit the protruding end of the elbow to slip over the mandrel. The chuck is then rotated and the rollers are gradually brought inward by means of the pull rod 55.

The elbow to be operated on has its end portions fairly straight, though a slight flaring is usual, as indicated in Figure 1.

Reference is now made to Figure 8, which shows the first stage of this operation. As the roller 20 is moved inwardly, the annular projections 21 form the groove, and, since the fitting itself is firmly held, upsets the wall, adjacent, as indicated at c. This adds metal to the oversize portion a of the wall, as well as to the undersize portion b, but the important point is that it adds metal to the undersize portion, and, as the roller is moved more and more inwardly, the cylindrical portion 22 comes into play, rolls down the upset, distributes the metal evenly, and finally brings the wall down to the desired thickness (preferably substantially the same as the thickness of the wall of the pipe to which it is to be welded), which will, in view of the nature of the operation, be uniform. The result of this further movement of the rollers 22 is illustrated in Figure 9, the end of the fitting being brought to the desired and uniform wall thickness.

This accomplished, the rollers are retracted, the carriage moved away from the chuck, the handle 95 swung through a right angle to the other stop, and the other end of the elbow treated similarly, as above. Usually one heating is sufficient to take care of the operation on both ends.

The final operation, as to each end, is to remove the waste part comprising the terminal piece d and the reduced rim e, as illustrated in Figure 10.

The above described method is also well suited for the production of elbows or other fittings provided at each end thereof with a projecting lip offset inwardly and adapted for snug insertion into a pipe of substantially the same internal diameter as the fitting and to which the fitting is to be welded.

Reference is now made to Figures 12, 13 and 14.

In this case, the mandrel, indicated at 19a, is shouldered at 19d, the larger part of the mandrel 19b being of substantially the same diameter as the interior of the fitting, and the smaller part of the mandrel 19c representing the internal diameter of the inwardly offset lip to be formed. Also, in this case, the annular projection 21a of the roller 20a has its face 21b, opposite from the cylindrical portion 22, flat at right angles to the axis of the roller. When mounted on the chuck, the face 21b of the roller is disposed slightly to the right (Figure 12) of the plane of the shoulder 19d.

The first part of the rolling operation is illustrated in Figure 12 and it will be seen that, in part, the same action which is illustrated by Figure 9 takes place, and, in addition, the fitting wall is rolled inwardly for the formation of the offset lip.

The result of this operation is illustrated in Figure 13.

In this instance, the final operation lies in removing only the terminal piece d' as waste, the reduced rim e remaining on the fitting, as indicated in Figure 14.

As previously stated, my invention is also applicable to T's of the character of that shown in Figure 3, and in Figure 15 I have illustrated the results in full lines.

In the case of a T, the recesses in the blocks 71 and 72 are, of course, correspondingly spaced, and in this instance the clamp 70, comprising these two blocks, is capable of movement into three operative positions, instead of but two as shown in Figure 6.

As previously stated, Figure 15 is complementary to Figure 3.

Since the end portions 18 of the T 16 have an excess wall thickness, the action of the cylindrical part 22 of the rollers brings the wall down to proper thickness, the annular projection on the rollers forming the groove as before. The result of this operation is indicated at the right of Figure 15, including the dotted lines, and the part indicated by the dotted lines is removed, as before, in finishing.

In the case of the neck of the T, that portion above the dot-and-dash line (Figure 3) is too thin, and, as the neck is rolled between the mandrel 19 and the rollers 20, the formation of the groove upsets the end of the fitting wall, as before, the additional metal thus provided being distributed evenly about the neck by the action of the cylindrical part of the rollers, bringing the wall to proper and uniform thickness. Also, as the cylindrical part of the roller approaches the neck, it first contacts the neck where its wall is thicker, below the dot-and-dash line, and, in rolling that down, it may also distribute metal to the thinner part of the neck.

I claim:

1. In the manufacture of pipe fittings, the method which comprises holding an article constituting a partially formed pipe fitting while being operated upon, rolling an outwardly widening groove in an end portion thereof against an interiorly disposed shouldered rigid mandrel confined against radial movement and conforming in diameter to the desired interior diameter of said end portion of said fitting, whereby the corresponding end of the remaining portion of the article is beveled and the portion at the bottom of the groove is offset inwardly, and removing the end of the article beyond said inward offset.

2. In the manufacture of pipe fittings, the method which comprises providing a partially formed pipe fitting having an end portion of tubular cross-section which has its wall of greater thickness at one side than at the other side thereof, placing said end portion over a rigid mandrel by relative movement between said fitting and said mandrel endwise of the latter, said mandrel being confined against radial movement and conforming in diameter to the desired interior diameter of said end portion of said fitting, and progressively rolling said end portion of said fitting about said mandrel to desired uniform wall thickness by a plurality of external rollers exerting forming pressure upon the outer surface of said end portion of said fitting and simultaneously moved inward toward said mandrel at a uniform rate as the rolling operation proceeds.

3. In the manufacture of pipe fittings, the method which comprises providing a partially formed pipe fitting having an end portion of tubular cross-section which has its wall of greater thickness at one side than at the other side thereof, placing said end portion over a rigid mandrel by relative movement between said fitting and said mandrel endwise of the latter, said mandrel being confined against radial movement and conforming in diameter to the desired interior diameter of said end portion of said fitting, and progressively rolling said end portion of said fitting about said mandrel to desired uniform wall thickness by an external roller exerting forming pressure upon the outer surface of said end portion of said fitting and moved inward toward said mandrel as the rolling operation proceeds.

4. In the manufacture of pipe fittings, the method which comprises providing a partially formed pipe fitting having an end portion of tubular cross-section with its wall of greater thickness at one side than at the opposite side thereof, placing said end portion over a rigid mandrel confined against radial movement and conforming in diameter to the desired interior diameter of said end portion of said fitting, rolling an outwardly widening groove of considerable depth in said end portion from the outer surface thereof in the absence of pressure upon the adjacent areas of said outer surface, whereby the wall of said end portion is upset outwardly along said groove, progressively displacing the upset metal from the thicker side of said wall and redistributing it to the thinner side of said wall while progressively rolling said groove to greater depth, and thereafter rolling said end portion to uniform wall thickness.

JAMES HALL TAYLOR.